(12) United States Patent
Faraone et al.

(10) Patent No.: US 9,899,879 B2
(45) Date of Patent: Feb. 20, 2018

(54) SYSTEMS AND METHODS FOR CONTROLLING WIRELESS POWER TRANSFER

(71) Applicant: MOTOROLA SOLUTIONS, INC., Schaumburg, IL (US)

(72) Inventors: Antonio Faraone, Fort Lauderdale, FL (US); Giorgi G. Bit-Babik, Plantation, FL (US); Chi T. Tran, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/043,786

(22) Filed: Feb. 15, 2016

(65) Prior Publication Data

US 2017/0237293 A1   Aug. 17, 2017

(51) Int. Cl.
| | |
|---|---|
| G06F 1/00 | (2006.01) |
| H02J 50/12 | (2016.01) |
| G06F 1/26 | (2006.01) |
| H02J 50/90 | (2016.01) |

(52) U.S. Cl.
CPC ............. *H02J 50/12* (2016.02); *G06F 1/26* (2013.01); *H02J 50/90* (2016.02)

(58) Field of Classification Search
CPC .................................. H02J 50/12; H02J 50/90
See application file for complete search history.

(56) References Cited

U.S. PATENT DOCUMENTS

| | | | |
|---|---|---|---|
| 7,146,139 B2 | 12/2006 | Nevermann | |
| 7,327,841 B2 | 2/2008 | Schreiber et al. | |
| 7,804,451 B2 | 9/2010 | Glocker et al. | |
| 8,611,815 B2 | 12/2013 | Mohammadian et al. | |
| 8,823,319 B2 | 9/2014 | Von Novak, III et al. | |
| 8,855,554 B2 | 10/2014 | Cook et al. | |

(Continued)

FOREIGN PATENT DOCUMENTS

| | | |
|---|---|---|
| EP | 2826000 | 1/2015 |
| WO | 2011032048 | 3/2011 |

(Continued)

OTHER PUBLICATIONS

PCT/US2017/013198 International Search Report and Written Opinion of the International Searching Authority dated Apr. 25, 2017 (13 pages).

*Primary Examiner* — Austin Hicks
(74) *Attorney, Agent, or Firm* — Michael Best & Friedrich LLP

(57) ABSTRACT

A system and method for wireless power transfer. The system includes a transmit coil having a first magnetic field having a first magnitude. The system also includes a receive coil, magnetically coupled to the transmit coil, having a second magnetic field having a second magnitude. The system also includes an electronic processor electrically coupled to the transmit coil and communicatively coupled to the receive coil. The electronic processor is configured to determine the first magnitude of the first magnetic field. The electronic processor is further configured to receive the second magnitude of the second magnetic field. The electronic processor is further configured to determine an efficiency based on the first magnitude and the second magnitude, and determine a power level for the transmit coil based on the efficiency.

14 Claims, 9 Drawing Sheets

(56) References Cited

U.S. PATENT DOCUMENTS

| | | |
|---|---|---|
| 9,048,882 B2 | 6/2015 | Yang et al. |
| 9,106,203 B2 | 8/2015 | Kesler et al. |
| 2012/0231731 A1 | 9/2012 | Kim et al. |
| 2012/0265000 A1 | 10/2012 | Ivkov et al. |
| 2014/0070622 A1 | 3/2014 | Keeling et al. |
| 2014/0070625 A1 | 3/2014 | Kim et al. |
| 2014/0091755 A1 | 4/2014 | Walley et al. |
| 2014/0361741 A1 | 12/2014 | Von Novak, III et al. |
| 2016/0064994 A1* | 3/2016 | Ku .................. H02J 7/025 307/104 |

FOREIGN PATENT DOCUMENTS

| | | |
|---|---|---|
| WO | 2011127449 | 10/2011 |
| WO | 2013056234 | 4/2013 |
| WO | 2013137892 | 9/2013 |

\* cited by examiner

… … …

SYSTEMS AND METHODS FOR CONTROLLING WIRELESS POWER TRANSFER

BACKGROUND OF THE INVENTION

Battery-powered, portable electronic devices are used for a variety of purposes. For example, public safety personnel (for example, police officers or other first responders) may use, for example, communication devices and recording devices that are useful to them during the performance of their duties. In another example, people engaging in hiking, mountain or rock climbing, hunting, or similar outdoor recreational activities may use a portable electronic device (for example, a navigation device) to enhance their recreational experience.

Wireless power transfer systems have been implemented to recharge the batteries of such devices. Wireless power transfer systems transfer electrical power, without wired connections, using, for example, inductive or resonant magnetic coupling.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
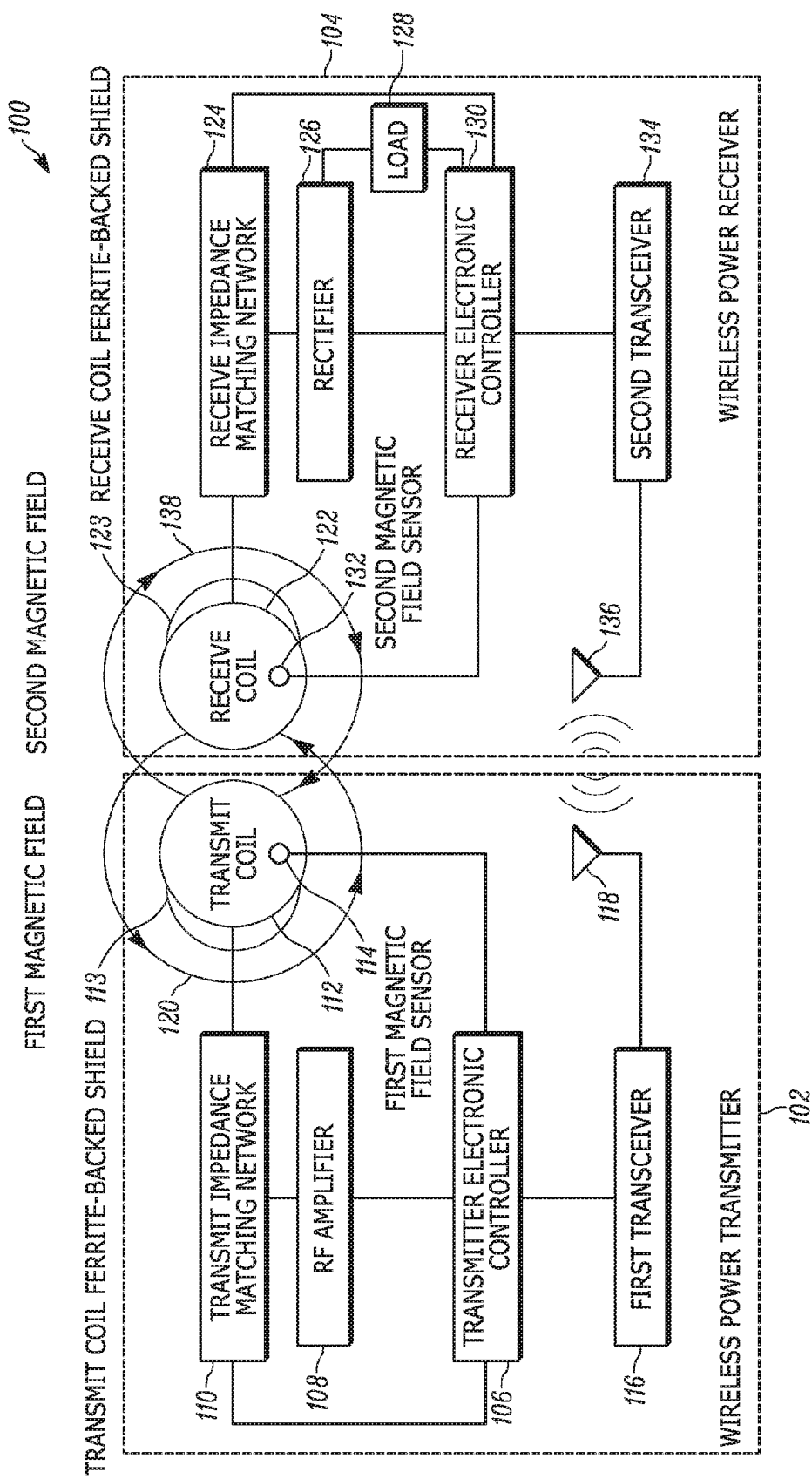
FIG. 1 is a diagram of a wireless power transfer system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for controlling a wireless power transfer system. The method includes generating, with a transmit coil, a first magnetic field having a first magnitude. The method further includes magnetically coupling a receive coil to the transmit coil to generate a second magnetic field having a second magnitude. The method further includes determining, by an electronic processor electrically coupled to the transmit coil and communicatively coupled to the receiving coil, the first magnitude of the first magnetic field. The method further includes receiving, by the electronic processor, the second magnitude of the second magnetic field. The method further includes determining, by the electronic processor, an efficiency based on the first magnitude and the second magnitude. The method further includes determining, by the electronic processor, a power level for the transmit coil based on the efficiency.

Another exemplary embodiment provides a wireless power transfer system. The system includes a transmit coil having a first magnetic field having a first magnitude. The system also includes a receive coil, magnetically coupled to the transmit coil, having a second magnetic field having a second magnitude. The system also includes an electronic processor electrically coupled to the transmit coil and communicatively coupled to the receive coil. The electronic processor is configured to determine the first magnitude of the first magnetic field. The electronic processor is further configured to receive the second magnitude of the second magnetic field. The electronic processor is further configured to determine an efficiency based on the first magnitude and the second magnitude, and determine a power level for the transmit coil based on the efficiency.

The term "wireless power transfer," as used herein, refers to the wireless transfer of electrical power by the inductive or resonant coupling of two or more coils. Coils so coupled are referred to herein as being magnetically coupled. Wireless power transfer using resonant coupling includes operating the coils at a resonant frequency, which is the same for both coils. A wireless power transfer device (for example, a battery charger) may be used to recharge the batteries of a portable electronic device. In certain types of wireless power transfer devices a transmit coil is energized at an operating frequency, producing an oscillating magnetic field. The battery or portable electronic device, containing a receive coil designed for the same operating frequency is placed in proximity to the transmit coil. The oscillating magnetic field induces an electric current in the receive coil, which is used to power battery charging circuits. When the transmit and receive coils are substantially aligned, efficient wireless power transfer can occur. Wireless power transfer efficiency is the ratio of the electrical power received by the receive coil to the electrical power transmitted by the transmit coil. In general, greater resonant wireless power transfer efficiency is achievable with resonant coupling, as compared to inductive coupling. However, when the coils are misaligned, power transfer efficiency is reduced, which generally increases the amount of transmit power needed to recharge the batteries for a given amount of time, or, conversely, generally reduces the amount of energy received for a given transmit power and charging time.

FIG. 1 is a block diagram of one exemplary embodiment of a wireless power transfer system 100. The wireless power transfer system 100 includes a wireless power transmitter 102 and a wireless power receiver 104. In some embodiments, the wireless power transmitter 102 is or is incorporated in a wireless battery charger and the wireless power receiver 104 is or is incorporated in a portable electronic device (for example, a smart telephone), which contains a battery that is charged when the wireless power receiver 104 is magnetically coupled to the wireless power transmitter 102. In some embodiments, the wireless power receiver 104 may be incorporated in a portable electronic device in the form of a smart garment (for example, a "smart vest"), which includes various integrated electronic components to monitor, assist, or provide communications for, the wearer.

The wireless power transmitter 102 includes a transmitter electronic controller 106, a radiofrequency (RF) amplifier 108, a transmit impedance matching network 110, a transmit coil 112, a transmit coil ferrite-backed shield 113, a first magnetic field sensor 114, a first transceiver 116, and a first antenna 118. The wireless power transmitter 102 may also include other components, for example, one or more resonant circuits, a suitable power source (for example, a battery or power rectifier), and other circuitry, which for clarity's sake are not illustrated. The foregoing components of the wireless power transmitter 102, along with other various modules and components, are coupled to each other by or through one or more electrical connections, which may include, for example, control or data buses that enable communication therebetween. The use of control and data buses for the interconnection between and exchange of information among the various modules and components would be apparent to a person skilled in the art in view of the description provided herein. For ease of description, the wireless power transmitter 102 illustrated in FIG. 1 includes only one of each of the listed components. Alternative embodiments may include more or fewer of each of these components, may combine some components, or may include other alternative components. The components may be integrated within the wireless power transmitter 102, or may be externally coupled and modular, for example, to enable the removal or addition of some of the components.

The transmitter electronic controller 106 is electrically coupled to the radiofrequency amplifier 108, the transmit impedance matching network 110, the first magnetic field sensor 114, and the first transceiver 116. In one exemplary embodiment, the transmitter electronic controller 106 is a microcontroller that includes at least an electronic processor, memory, and input/output interface. The electronic processor executes computer readable instructions ("software") stored in the memory to control the radiofrequency amplifier 108, and the transmit impedance matching network 110 as described herein to wirelessly transmit electrical power via the transmit coil 112.

The radiofrequency amplifier 108 receives a direct current power (DC) signal from a power source (not shown). The transmitter electronic controller 106 controls the radiofrequency amplifier 108 to output an amplified alternating current (AC) electrical signal at a predetermined operating frequency. The operating frequency of the wireless power transmitter 102 is the same as the operating frequency of the wireless power receiver 104. As can be appreciated by one skilled in the art, the operating frequency is determined by, among other things, the physical characteristics of the transmit coil 112 and resonant circuits for example, one or more capacitors coupled to the transmit coil 112, which, for clarity's sake are not shown or described herein. The transmitter electronic controller 106 also controls the power level of the alternating current electrical signal produced by the radiofrequency amplifier 108 to control the amount of power wirelessly transferred.

The alternating current electrical signal is fed to the transmit impedance matching network 110. The transmitter electronic controller 106 controls the transmit impedance matching network 110 to efficiently couple the radiofrequency amplifier 108 to the transmit coil 112.

The transmit coil 112 receives the alternating current signal from the transmit impedance matching network 110. The alternating electrical current within the transmit coil 112 produces a first magnetic field 120. The first magnetic field 120 is a time-varying magnetic field, which oscillates at the same frequency as the alternating current signal that produced it (that is, the operating frequency).

As can be appreciated by one skilled in the art, resonant coupling systems may include more than one coil on the transmitter side and more than one coil on the receiver side. For ease of description, the transmit coil 112 is described herein in terms of a single coil. In one example, the transmit coil 112 is a flat-wound multiple turn coil with a generally planar form. The transmit coil 112 may be, for example, circular, rectangular, or square in shape. The transmit coil ferrite-backed shield 113 includes a metal shield layer and a ferrite layer, and is positioned such that the other components of the wireless power transmitter 102 will generally be shielded from any electromagnetic fields emanating from the transmit coil 112. In some embodiments, the transmit ferrite-backed shield 113 is positioned such that the ferrite-layer is closer to the transmit coil 112 than the metal shield layer.

In one exemplary embodiment, the first magnetic field sensor 114 includes a wire loop positioned at the center of and substantially coplanar with the transmit coil 112. The first magnetic field 120 induces an electromotive force that results in an electrical signal at the loop terminals, which is processed by suitable circuitry (not shown), the transmitter electronic controller 106, or both, to determine a magnitude and phase of the first magnetic field 120. The first magnetic field sensor 114 is electrically coupled to the transmitter electronic controller 106 to provide the transmitter electronic controller 106 with measurements of a magnitude and phase of the first magnetic field 120.

The first transceiver 116 is electrically coupled to the transmit electronic controller 106 and the first antenna 118, and includes a radiofrequency transceiver that provides wireless communications via the first antenna 118 using suitable network modalities (e.g., Bluetooth™, near field communication (NFC), Wi-Fi™, and the like). Alternative embodiments may include an audio transceiver, a light transceiver, or some other suitable mechanism for near-range communications. As illustrated, the first transceiver 116 communicatively couples the transmit electronic controller 106 with the wireless power receiver 104. The first transceiver 116 includes other components that enable wireless communication (e.g., amplifiers, baseband processors, and the like), which for brevity are not described herein and which may be implemented in hardware, software, or a combination of both. Some embodiments include multiple transceivers or separate transmitting and receiving components (e.g., a transmitter and a receiver) instead of a combined transceiver. In alternative embodiments, the first transceiver 116 is electrically coupled to the transmit coil 112 in place of, or in addition to, the first antenna 118.

The wireless power receiver 104 includes a receive coil 122, a receive coil ferrite-backed shield 123, a receive impedance matching network 124, a rectifier 126, a load 128, a receiver electronic controller 130, a second magnetic field sensor 132, a second transceiver 134, and a second antenna 136. The wireless power receiver 104 may also include other components, for example, one or more resonant circuits, a suitable power source (for example, a battery or power rectifier), and other circuitry, which for clarity's sake are not illustrated. The foregoing components of the wireless power receiver 104, along with other various modules and components are coupled to each other by or through one or more electrical connections, which may include, for example, control or data buses that enable communication therebetween. The use of control and data buses for the interconnection between and exchange of information among the various modules and components would be apparent to a person skilled in the art in view of the description provided herein. For ease of description, the wireless power receiver 104 illustrated in FIG. 1 includes only one of each of the listed components. Alternative embodiments may include more or fewer of each of these components, may combine some components, or may include other alternative components. The components may be integrated within the wireless power receiver 104, or may be externally coupled and modular, for example, to enable the removal or addition of some of the components.

As can be appreciated by one skilled in the art, when the transmit coil 112 is positioned in proximity to the receive coil 122, the first magnetic field 120 (according to Faraday's law of induction) induces an alternating electrical current in the receive coil 122. (As with the transmit coil 112, for ease of description, the receive coil 122 is described herein in terms of a single coil.) The alternating electrical current in the receive coil 122, in turn, produces a second magnetic field 138, which is substantially opposed the first magnetic field 120. The alternating electrical current in the receive coil 122 and the resulting second magnetic field 138 oscillate at the operating frequency. In some embodiments, the receive coil 122 is similar in shape and composition to the transmit coil 112, and is positioned similarly with respect to the receive coil ferrite-backed shield 123.

The alternating current electrical signal from the receive coil 122 is fed to the receive impedance matching network 124. The receiver electronic controller 130 controls the receive impedance matching network 124 to efficiently couple the rectifier 126 and the load 128 to the receive coil 122. The rectifier 126, which may include a full-wave rectifier, receives the alternating electrical current and produces from it a direct current signal. The rectifier 126 may include other electronic components (for example, filters and voltage converters), which for brevity are not described herein.

The rectifier 126 feeds the direct current signal to the load 128. In some embodiments, the load 128 is a battery pack (that is, one or more batteries) and suitable electronic components for charging the battery pack using the direct current signal. In some embodiments, the load 128 may also include other electronic systems or components (for example, a charging circuit for an external device), which can be powered directly from the wirelessly received power.

The receiver electronic controller 130 is electrically coupled to the receive impedance matching network 124, the rectifier 126, the load 128, the second magnetic field sensor 132, and the second transceiver 134. The receiver electronic controller 130 contains similar components as the transmitter electronic controller 106, and controls the components of the wireless power receiver 104 to wirelessly receive electrical power via the receive coil 122 and provide that power to the load 128.

The second magnetic field sensor 132 contains similar components as, and is configured similarly to, the first magnetic field sensor 114. Accordingly, the second magnetic field sensor 132 provides measurements of a magnitude and phase of the second magnetic field 138 to the receiver electronic controller 130.

The second transceiver 134 contains similar components as, and is configured similarly to, the first transceiver 116. Accordingly, the second transceiver 134 is electrically coupled to the receiver electronic controller 130 and the second antenna 136, and communicatively couples the receiver electronic controller 130 with the wireless power transmitter 102. In alternative embodiments, the second transceiver 134 is electrically coupled to the receive coil 122 in place of, or in addition to, the second antenna 136.

Figure 2:
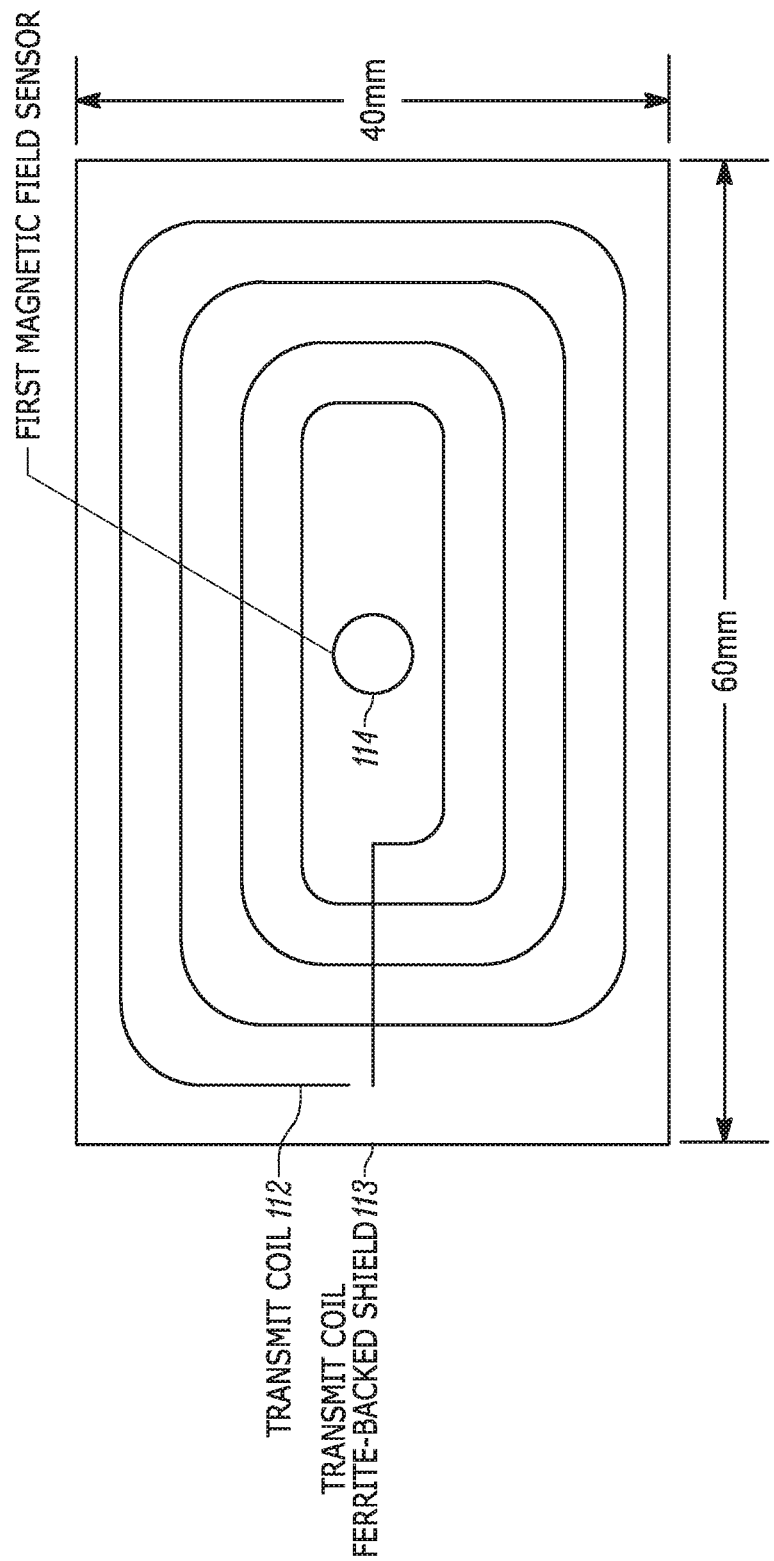
FIG. 2 is a diagram of a transmit coil in accordance with some embodiments.

FIG. 2 is a diagram of one exemplary embodiment of the transmit coil 112 and the transmit coil ferrite-backed shield 113. As illustrated, the transmit coil 112 and the transmit coil ferrite-backed shield 113 are positioned concentrically to each other and are substantially similar in size and shape. As noted above, the transmit ferrite-backed shield 113 is positioned with the ferrite layer facing the transmit coil 112. In the example illustrated in FIG. 2, the transmit coil 112 is rectangular in shape, sixty millimeters long (that is, along the X axis), and forty millimeters wide (that is, along the Y axis). The examples that follow are described in terms of a transmit coil 112 and a receive coil 122, each arranged with a corresponding sensor and ferrite-backed shield as illustrated in FIG. 2, and each having the shape and dimensions illustrated in FIG. 2. One skilled in the art will appreciate that the dimensions listed herein are approximate and exemplary only, and the actual dimensions will vary from the examples provided. It should also be noted that the systems and methods described herein are not limited in their use to coils as illustrated in FIG. 2, but may also be applied to coils of different shapes and dimensions.

Figure 3:
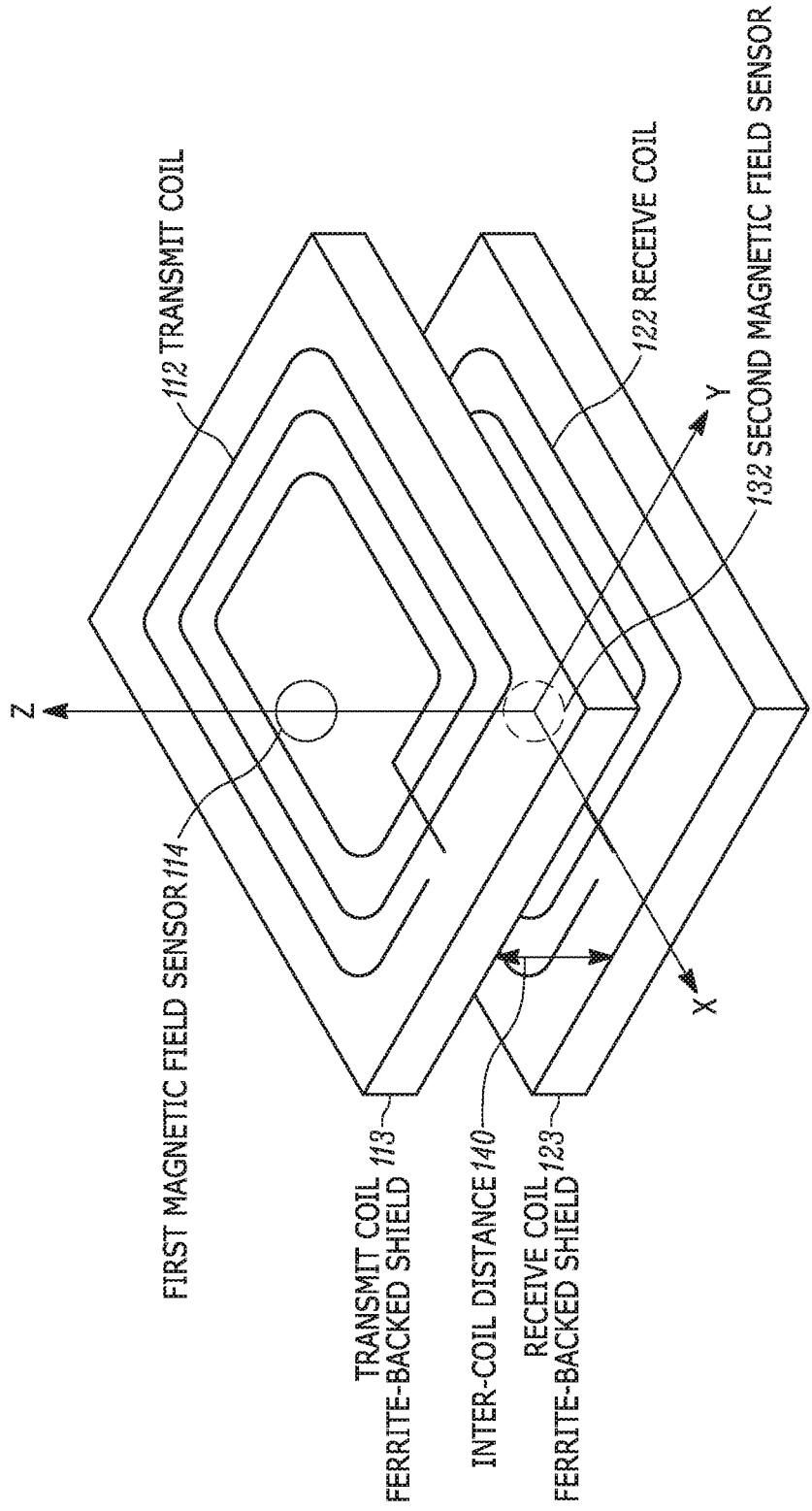
FIG. 3 is a perspective view of a transmit coil aligned with a receive coil in accordance with some embodiments.

As noted above, when the transmit coil 112 is positioned in proximity to the receive coil 122, electrical power transfer will occur wirelessly via magnetic induction. FIG. 3 illustrates the transmit coil 112 and the receive coil 122 substantially parallel to and aligned with each other (that is, there is no lateral displacement in either the X or Y axes) and separated by an inter-coil distance 140. The wireless power transfer efficiency (that is, the ratio of the electrical power received by the receive coil 122 to the electrical power transmitted by the transmit coil 112) decreases with the inter-coil distance 140.

Figure 4:
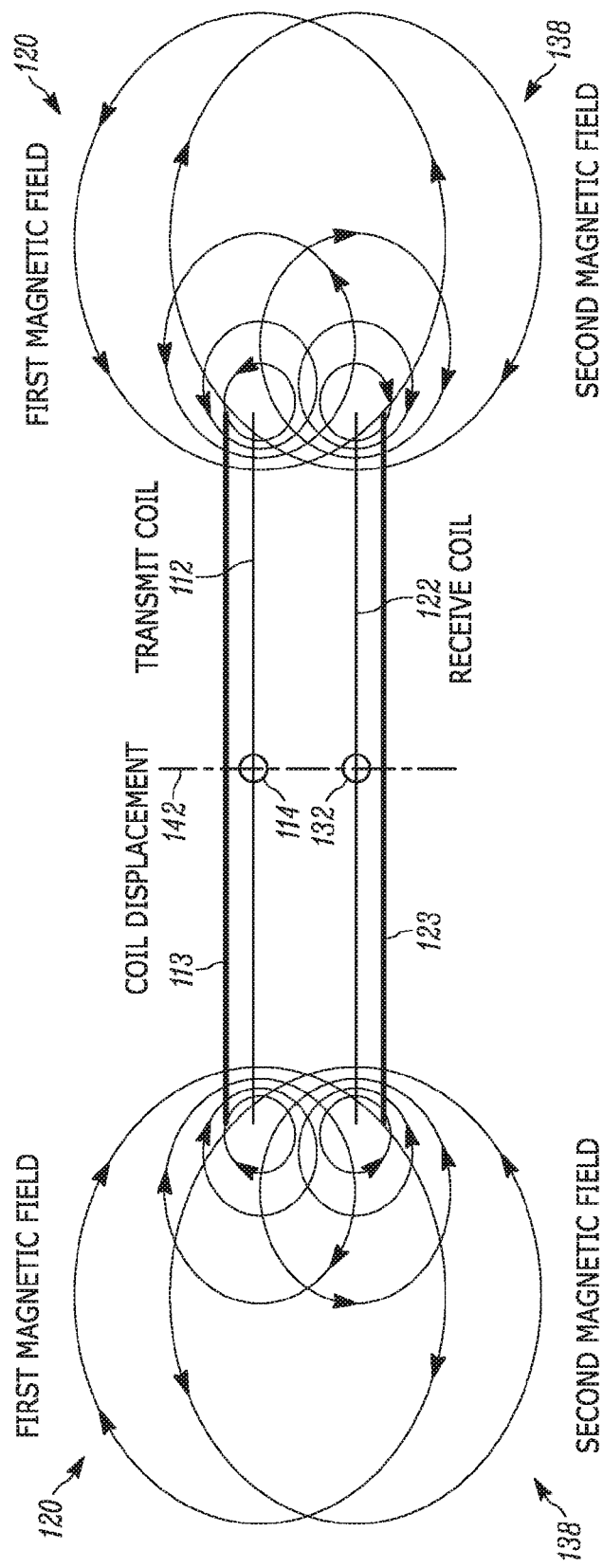
FIG. 4 is a cross sectional view of a transmit coil aligned with a receive coil in accordance with some embodiments.
Figure 5:
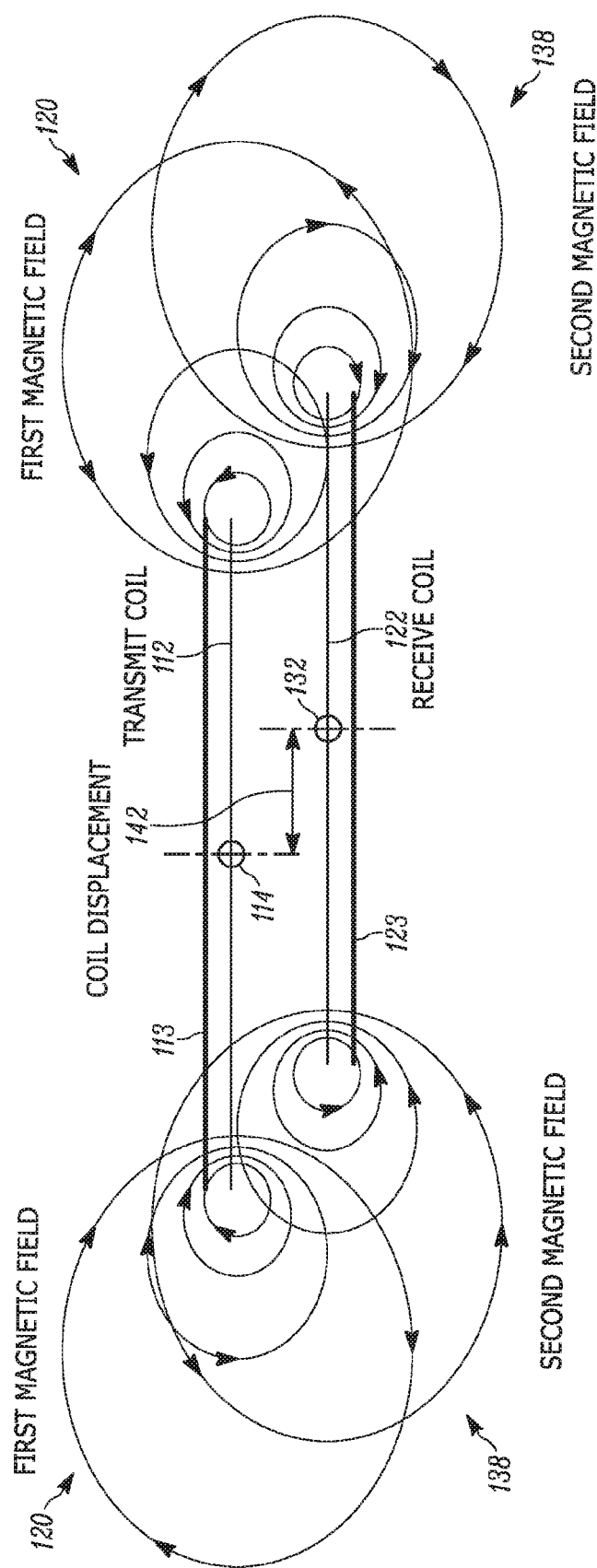
FIG. 5 is a cross sectional view of a transmit coil misaligned with a receive coil in accordance with some embodiments.

The wireless power transfer efficiency also varies with the alignment of the transmit coil 112 with the receive coil 122. The transmit coil 112 does not have to be precisely aligned with the receive coil 122 in order for wireless power transfer to occur. However, as lateral displacement (that is, non-alignment) in either the X axis or Y axis increases, wireless power transfer efficiency decreases. According to Lenz's law, the electrical current induced in the receive coil 122 will produce a second magnetic field 138 that is substantially opposite to the first magnetic field 120 produced by the alternating current in the transmit coil 112. As illustrated in FIG. 4, the coil displacement 142 (that is, the displacement between the geometric center of the transmit coil 112 and the geometric center of the receive coil 122) is zero, and the inter-coil distance 140 is substantially smaller than the transverse dimensions (X,Y) of the coils. When the coils are positioned as illustrated in FIG. 4, substantial magnetic field cancellation occurs because the first magnetic field 120 is almost totally concatenated with and essentially opposite to the second magnetic field 138. However, when the coil displacement 142 increases, as illustrated in FIG. 5, the first magnetic field 120 and the second magnetic field 138 are not aligned, and magnetic field cancellation is reduced. It should be noted that, in FIG. 4 and FIG. 5, the flux lines illustrated represent only the presence and approximate locations of the first magnetic field 120 and the second magnetic field 138. For clarity's sake, the flux lines are not intended to provide a complete and accurate depiction of the size, shape, and location of the first magnetic field 120 and the second magnetic field 138.

Figure 6:
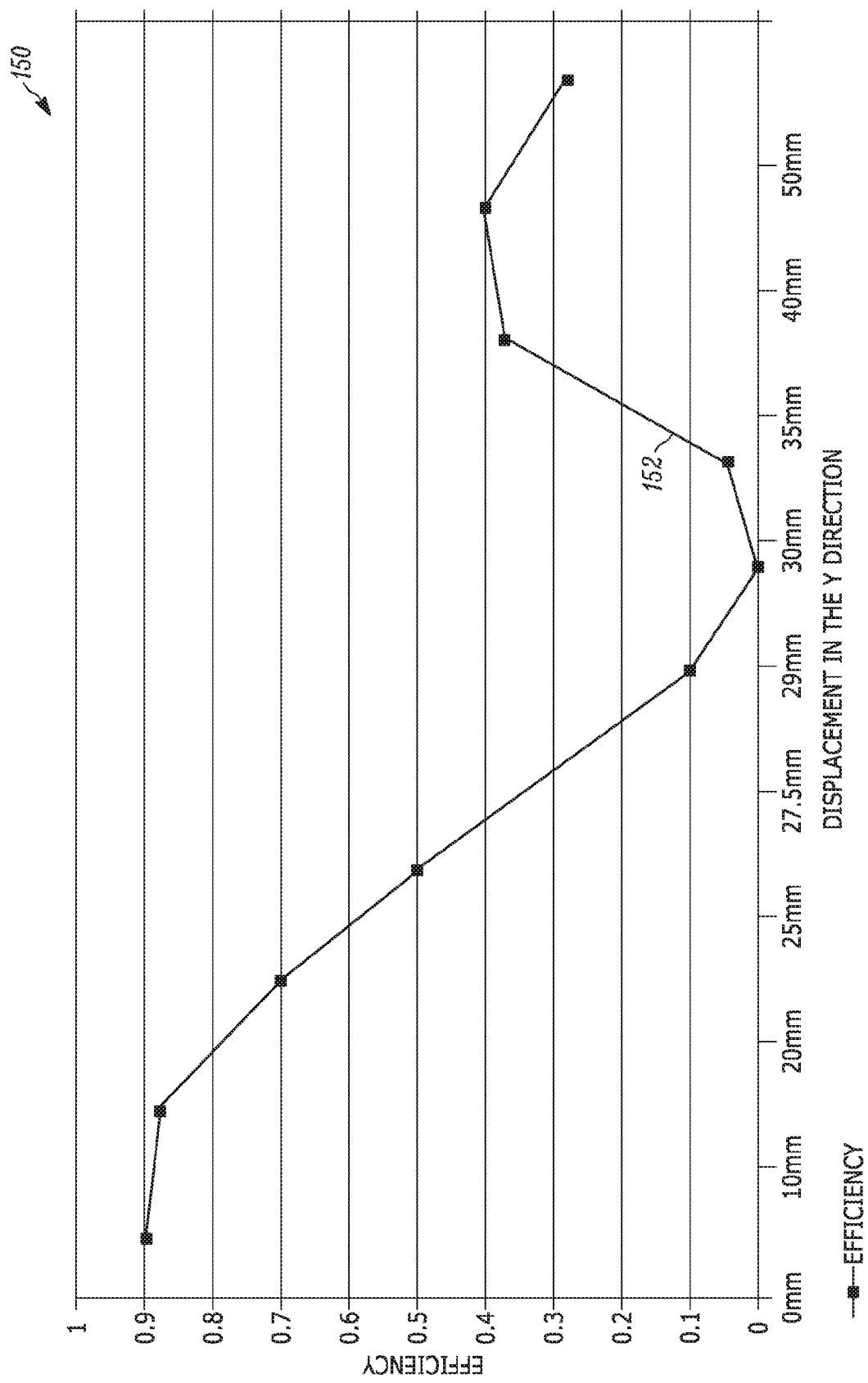
FIG. 6 is a chart illustrating the relationship between efficiency and coil displacement in accordance with some embodiments.
Figure 7:
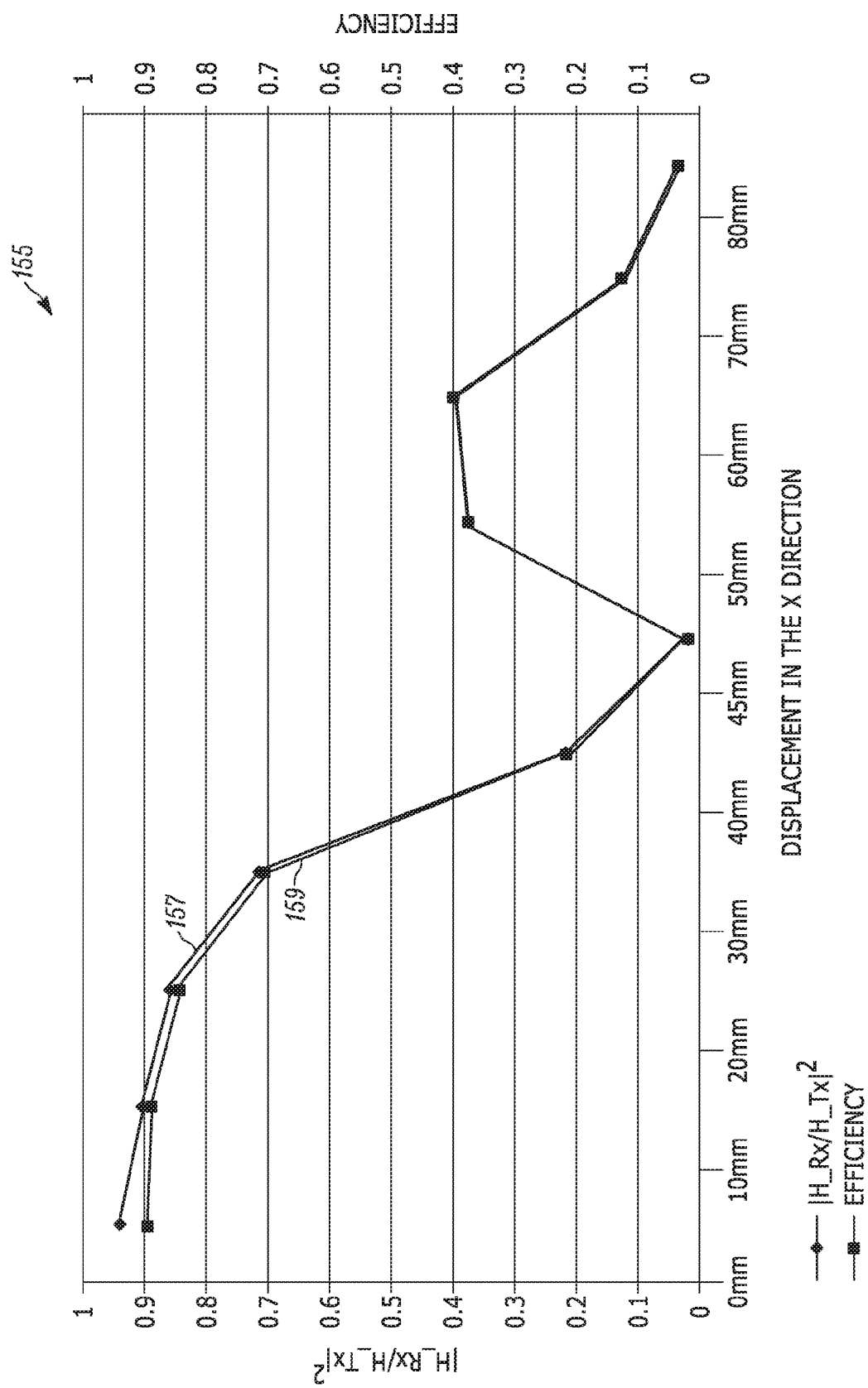
FIG. 7 is a chart illustrating the relationship between magnetic field strength ratio, wireless power transfer efficiency, and coil displacement in accordance with some embodiments.

The chart 150, illustrated in FIG. 6, shows the relationship between wireless power transfer efficiency (line 152) and coil displacement 142 (in the Y direction), where the transmit impedance matching network 110 parameters and the receive impedance matching network 124 parameters have been selected to maximize wireless power transfer. As illustrated, wireless power transfer efficiency generally decreases as the coil displacement 142 increases. As illustrated by the chart 150, the efficiency decreases rapidly to near zero as the coil displacement 142 increases to approximately twenty-nine millimeters. This indicates the distance where minimal magnetic field concatenation, and thus minimal magnetic field cancellation, occurs. Wireless power transfer efficiency may also be related to the ratio of the electric current induced in the receive coil 122 by the first magnetic field 120 to the electric current produced in the transmit coil 112 by the radiofrequency amplifier 108. As illustrated in FIG. 7 (chart 155), relative to coil displacement in the X direction, the ratio of two currents may be determined from the magnitudes of the two magnetic fields produced by those currents. For example, the squared ratio of the magnitude of the second magnetic field 138 (H_Rx) to the magnitude of the first magnetic field 120 (H_Tx), shown in line 157, is substantially similar to the wireless power transfer efficiency (line 159). Therefore, it is possible to determine the wireless power efficiency from the squared ratio of the magnetic field strengths ($|H\_Rx/H\_Tx|^2$). As described herein, the wireless power efficiency can be used to make adjustments to the transmit power and other system parameters.

Figure 8:
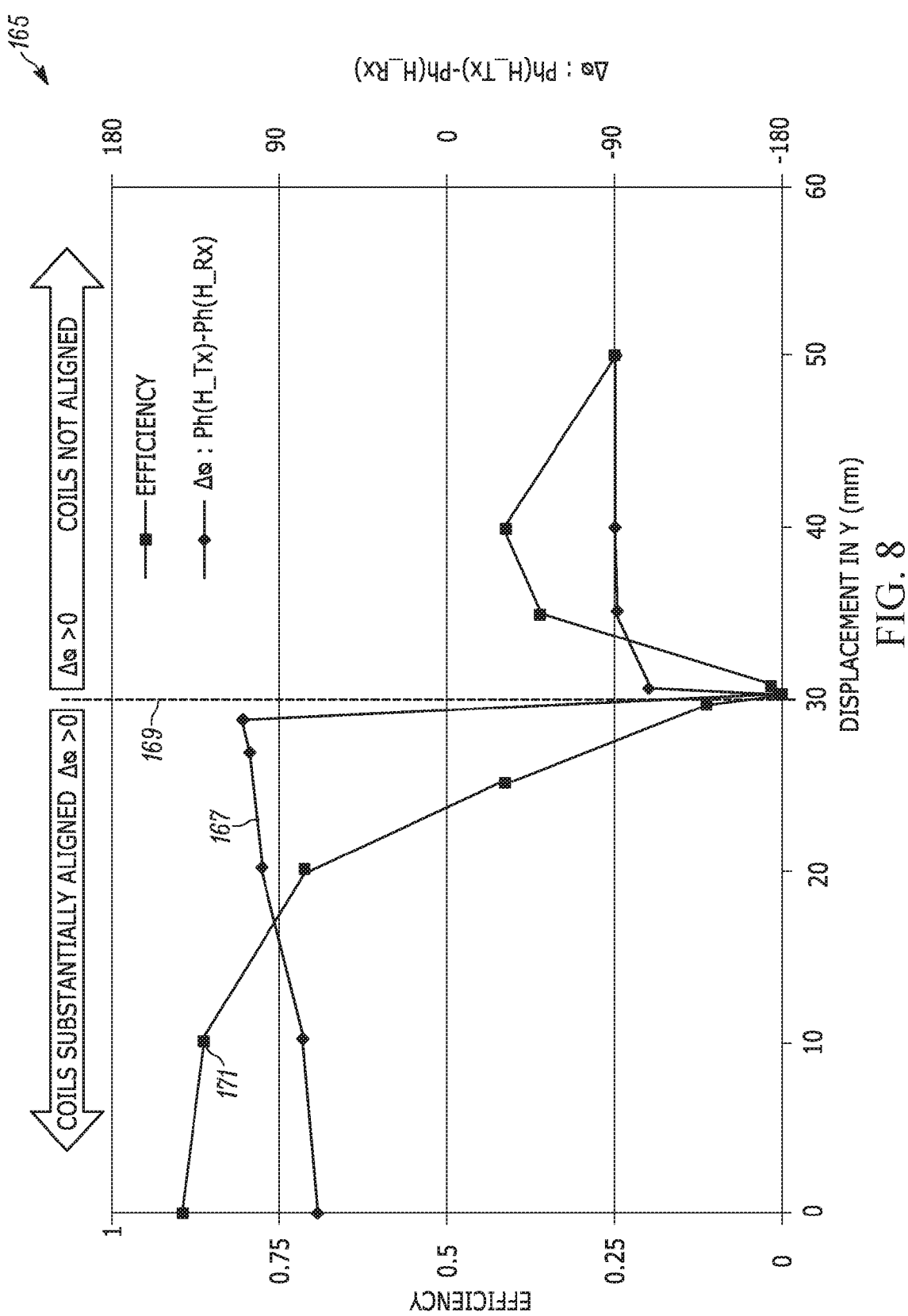
FIG. 8 is a chart illustrating the relationship between magnetic field phase difference, efficiency, and coil displacement in accordance with some embodiments.

As illustrated in FIG. 7, some values of $|H\_Rx/H\_Tx|^2$ correspond to more than one value of the coil displacement 142. Additionally, increasing the inter-coil distance 140 (see FIG. 3) will also result in lower wireless power transfer efficiency, and therefore produce a lower value for the magnitude of $|H\_Rx/H\_Tx|^2$. In such case, a non-zero coil displacement 142 might be erroneously determined, even when the transmit coil 112 is aligned with the receive coil 122 (that is, the coil displacement 142 is indeed zero). Accordingly, as illustrated in FIG. 8, the phase difference between H_Rx and H_Tx may be used to increase the confidence of the coil displacement 142 estimate by determining whether the displacement is lesser or greater than the distance at which the sign reversal of the phase difference occurs. As illustrated in FIGS. 6 and 7, the distance at with sign reversal occurs generally corresponds to the distance at which minimal magnetic field cancellation occurs. For example, for coils as illustrated in FIG. 2, sign reversal occurs at twenty-nine millimeters in the Y direction (FIG. 6), and at forty-five millimeters in the X direction (FIG. 7). Coils of other dimensions will produce sign reversal at other distances, which may be determined experimentally.

FIG. 8 illustrates a chart 165, which shows the relationship between the phase difference (Δφ) between H_Tx and H_Rx (line 167) and the coil displacement 142 (in the Y direction). As illustrated, the sign of the phase difference reverses at a particular coil displacement 142 (that is, twenty-nine millimeters, shown at point 169). Prior to point 169, the value of the phase difference is positive, and after point 169, the value is negative. As illustrated in FIG. 8, unlike the efficiency (line 171), each value of Δφ will yield only one value for the coil displacement 142. Therefore, as explained in more detail below, it may be determined, using the phase difference, whether a given efficiency indicates that the coils are out of alignment, or whether the distance between the coils exceeds the ordinary range for efficient power transfer.

Figure 9:
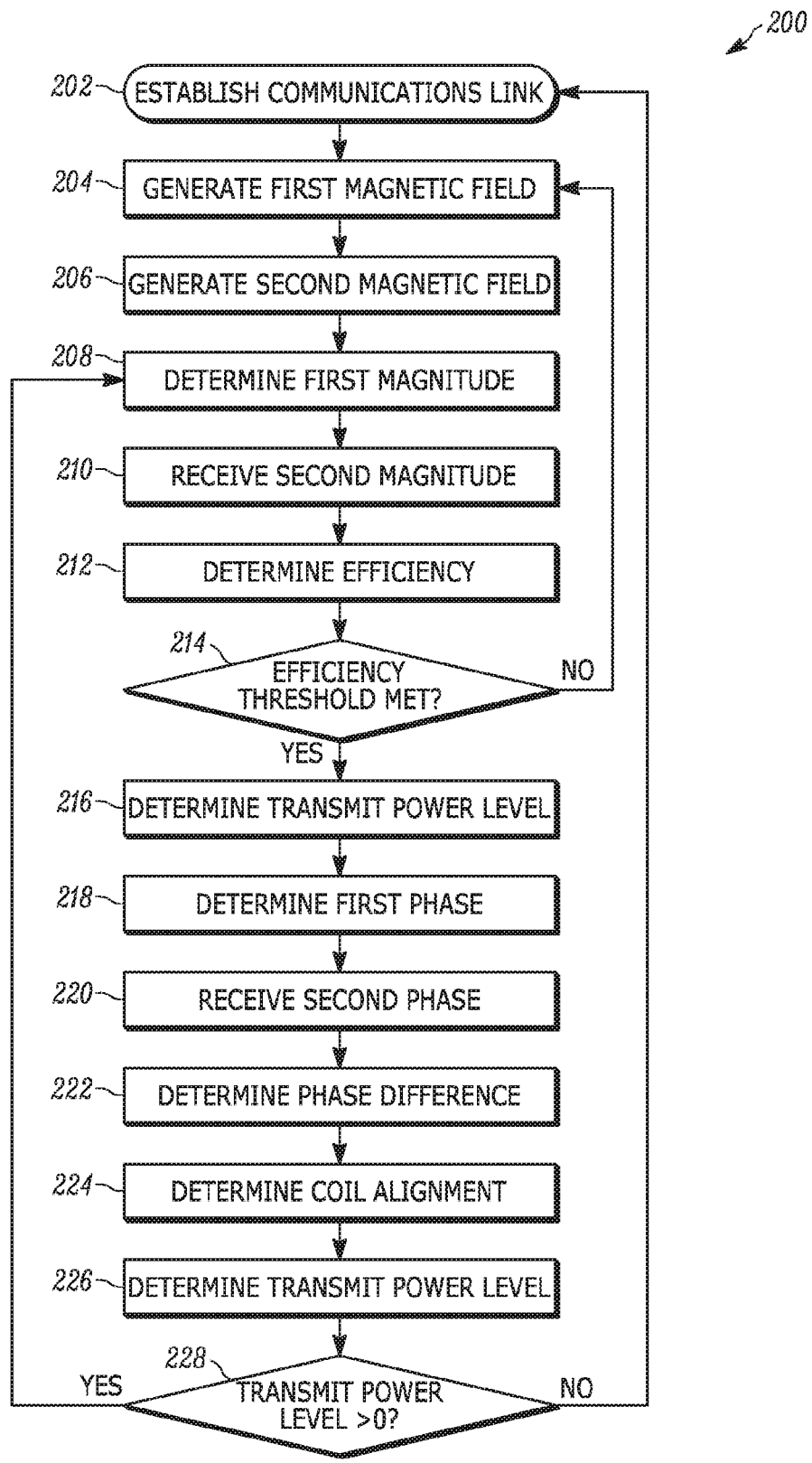
FIG. 9 is a flowchart of a method of controlling the wireless power transfer system of FIG. 1 in accordance with some embodiments.

FIG. 9 illustrates an exemplary method 200 for controlling the wireless power transfer system 100. As an example, the method 200 is described in terms of the wireless power transmitter 102. This should not be considered limiting. The methods described herein could be implemented on the wireless power transmitter 102, the wireless power receiver 104, a combination of the two, an external electronic processor communicatively coupled to wireless power transmitter 102, and the wireless power receiver 104, or some combination of the foregoing.

At block 202, a communications link is established between the transmitter electronic controller 106 and the receiver electronic controller 130. In some embodiments, this communications link is established between the first transceiver 116 and the second transceiver 134, via the first antenna 118 and the second antenna 136. In alternative embodiments, the transmit coil 112 and the receive coil 122 are used in place of the first antenna 118 and the second antenna 136, respectively.

At block 204, the transmitter electronic controller 106 controls the components of the wireless power transmitter 102, as described above, to generate the first magnetic field 120. In some embodiments, the first magnetic field 120 is generated using a predetermined power level (that is, magnitude) suitable for powering the load 128 of the wireless power receiver 104. In alternative embodiments, the first magnetic field 120 is generated using a series of short diagnostic current bursts used to determine a power level for the first magnetic field 120 and an approximate displacement between the coils, based on the efficiency and phase difference, as described in greater detail below. The first magnetic field 120 induces an electric current in the receive coil 122, which, in turn, generates a second magnetic field 138, at block 206.

At block 208, the transmitter electronic controller 106 determines a first magnitude. In one exemplary embodiment, the first magnitude is the magnitude of a field strength of the first magnetic field 120 (H_Tx), as sensed by the first magnetic field sensor 114. At block 210, the transmitter electronic controller 106 receives a second magnitude. In one exemplary embodiment, the second magnitude is a magnitude of the field strength of the second magnetic field 138 (H_Rx). The second magnitude is sensed by the second magnetic field sensor 132, and sent to the transmitter electronic controller 106 by the receiver electronic controller 130 over the communications link established at block 202.

At block 212, the transmitter electronic controller 106 determines efficiency based on the first magnitude and the second magnitude. In one exemplary embodiment, the transmitter electronic controller 106 determines the wireless power transfer efficiency by calculating the ratio of the second magnitude to the first magnitude $|H\_Rx/H\_Tx|^2$. In some embodiments, current measurements may be used instead of magnetic field strength measurements to determine efficiency. For example, the first magnitude determined at block 208 may be the magnitude of the current fed into the transmit coil 112, as measured by a current sensor, and the second magnitude received at block 210 is the magnitude of the current induced in the receive coil 122, as measured by a current sensor. In such cases, the efficiency is determined at block 212 by calculating a ratio based on the current magnitudes.

At block 214, the transmitter electronic controller 106 determines whether an efficiency threshold has been met. The efficiency threshold is the efficiency level, below which the wireless power transmitter 102 will not attempt to transmit power to the wireless power receiver 104. In some embodiments, the threshold may be determined based on, for example, the maximum power available from the radiofrequency amplifier 108 (for example, the radiofrequency amplifier 108 may not be capable of transferring sufficient power for the load 128 at efficiencies below 50%, or such power levels may not be desirable). In other embodiments, the threshold is determined based on other factors, or combinations of factors. When the efficiency threshold has not been met, the transmitter electronic controller 106 continues to generate the first magnetic field 120 and test for efficiency, at blocks 204 through 214, until the threshold is met.

When the efficiency threshold is met, the transmitter electronic controller 106 determines a transmit power level for the first magnetic field 120, at block 216. The transmit power level is based on the efficiency. For example, when the transmitter electronic controller 106 determines that the wireless power transfer efficiency is 70%, it may increase the transmit power level to increase the amount of power transferred such that the wireless power receiver 104 receives as much power as it would when efficiency is optimal.

At block 218, the transmitter electronic controller 106 determines a first phase for the first magnetic field 120 (Ph(H_Tx)), as sensed by the first magnetic field sensor 114. At block 220, the transmitter electronic controller 106 receives a second phase for the second magnetic field 138 (Ph(H_Rx)). The second phase is sensed by the second magnetic field sensor 132, and sent to the transmitter electronic controller 106 by the receiver electronic controller 130 over the communications link established at block 202.

At block 222, the transmitter electronic controller 106 determines a phase difference (Δϕ) by subtracting Ph(H_Rx) from Ph(H_Tx). At block 224, the transmitter electronic controller 106 determines a coil alignment estimate based on the phase difference. For example, the transmitter electronic controller 106 may compare the phase difference to coil displacement data (for example, chart 165 of FIG. 8), stored in a memory of the transmitter electronic controller 106. Based on this coil displacement, the transmitter electronic controller 106 determines whether the coils are substantially aligned, or not aligned. In one embodiment, the transmitter electronic controller 106 may compare the coil displacement to chart 165 (FIG. 8) stored in a memory of the transmitter electronic controller 106. For example, when Δϕ>0, the transmitter electronic controller 106 determines that the coils are substantially aligned, while the opposite is determined when Δϕ<0.

At block 226, the transmitter electronic controller 106 determines the transmit power level for the first magnetic field 120 based on the efficiency and the coil alignment. For example, when the transmitter electronic controller 106 determines that the coils are not substantially aligned, it may determine a power level of zero, because too much power would be dissipated before being received by the receive coil 122. In another example, when the transmitter electronic controller 106 determines that the coils are substantially aligned and the efficiency is lower than expected for aligned coils, it may determine that the coils are aligned, yet too far apart for effective power transfer at the current power setting. In such case, the aligned magnetic fields would allow for more power transfer than would occur in the non-aligned case. Accordingly, the transmitter electronic controller 106 may determine that the transmit power level should be increased to improve power transfer to the wireless power receiver. As a further example, the transmitter electronic controller 106 may determine that the transmit power should be set at a level so as to maintain a specific absorption rate (SAR) that is compliant with applicable regulatory limits.

In alternative embodiments, determining the transmit power level (at blocks 216 and 226) includes adjusting the impedance of the transmit coil 112 and the receive coil 122 by controlling the transmit impedance matching network 110 and the receive impedance matching network 124, respectively, to improve the wireless power transfer efficiency.

When the transmitter electronic controller 106 determines that the transmit power level is greater than zero (block 228), the transmitter electronic controller 106 continues to monitor the magnitudes and phases of the magnetic fields to adjust the power transmit level, at blocks 208 through 226. When the transmitter electronic controller 106 determines that the transmit power level is not greater than zero (block 228), the transmitter electronic controller 106 restarts the method 200 by establishing a communications link (at block 202).

Specific absorption rate (SAR) is a measure of the amount of energy absorbed by the body when using a radiofrequency device. Various government regulations limit specific absorption rates for radiofrequency devices. A reduction in efficiency caused by misaligned coils may lead to an increase in the specific absorption rate because of reduced magnetic field cancellation. Similarly, the increase in efficiency, which results from substantially aligned coils, may result in a reduction in the specific absorption rate. As can be appreciated by one skilled in the art, the systems and methods described herein may therefore be used to determine the specific absorption rates for various values of the coil displacement 142 at a given transmit power.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling a wireless power transfer system, the method comprising:
   generating, with a transmit coil, a first magnetic field having a first magnitude;
   magnetically coupling a receive coil to the transmit coil to generate a second magnetic field having a second magnitude;
   determining, by an electronic processor electrically coupled to the transmit coil and communicatively coupled to the receiving coil, at least one selected from the group consisting of the first magnitude of the first magnetic field and a first current magnitude of a current in the transmit coil;
   receiving, by the electronic processor, at least one selected from the group consisting of the second magnitude of the second magnetic field and a second current magnitude of a current in the receive coil;
   determining, by the electronic processor, an efficiency based on at least one of the group consisting of the first magnitude, the second magnitude, the first current magnitude, and the second current magnitude;
   determining, in response to the efficiency exceeding an efficiency threshold:
   a first phase of the first magnetic field;
   a second phase of the second magnetic field;
   a phase difference based on the first and second phases;
   a coil alignment based on the phase difference; and
   a power level for the transmit coil based on the efficiency and the coil alignment.

2. The method of claim 1, wherein determining an efficiency includes determining a ratio based on the first magnitude and the second magnitude.

3. The method of claim 1, wherein determining an efficiency includes determining a ratio based on the first current magnitude and the second current magnitude.

4. The method of claim 1, further comprising:
   generating, with a radiofrequency amplifier, a plurality of diagnostic current bursts.

5. The method of claim 1, further comprising:
   adjusting, by the electronic processor, based on the efficiency, at least one of a group consisting of a first impedance for a first impedance matching network coupled to the transmit coil and a second impedance for a second impedance matching network coupled to the receive coil.

6. The method of claim 1, further comprising:
   determining, by the electronic processor, a power level for the transmit coil based on the coil alignment.

7. The method of claim 1, further comprising:
   adjusting, by the electronic processor, at least one of a group consisting of a first impedance for a first impedance matching network coupled to the transmit coil and a second impedance for a second impedance matching network coupled to the receive coil, based on the efficiency and the coil alignment.

8. A wireless power transfer system, the system comprising:
   a transmit coil having a first magnetic field having a first magnitude;

a receive coil, magnetically coupled to the transmit coil, having a second magnetic field having a second magnitude; and an electronic processor electrically coupled to the transmit coil and communicatively coupled to the receive coil, and configured to determine at least one selected from the group consisting of the first magnitude of the first magnetic field and a first current magnitude of a current in the transmit coil;

receive at least one selected from the group consisting of the second magnitude of the second magnetic field and a second current magnitude of a current in the receive coil;

determine an efficiency based on at least one of the group consisting of the first magnitude, the second magnitude, the first current magnitude, and the second current magnitude;

determine, in response to the efficiency exceeding an efficiency threshold:
 a first phase of the first magnetic field;
 a second phase of the second magnetic field;
 a phase difference based on the first and second phases;
 a coil alignment based on the phase difference; and
 a power level for the transmit coil based on the efficiency and the coil alignment.

9. The system of claim 8, wherein the electronic processor is further configured to determine a ratio based on the first magnitude and the second magnitude.

10. The system of claim 8, wherein the electronic processor is further configured to determine a ratio based on the first current magnitude and the second current magnitude.

11. The system of claim 8, further comprising:
a radiofrequency amplifier electrically coupled to the electronic processor, wherein the electronic processor is further configured to
generate, with the radiofrequency amplifier, a plurality of diagnostic current bursts.

12. The system of claim 8, further comprising:
a first impedance matching network electrically coupled to the electronic processor; and
a second impedance matching network communicatively coupled to the electronic processor,
wherein the electronic processor is further configured to adjust, based on the efficiency, at least one of a group consisting of a first impedance for the first impedance matching network and a second impedance for the second impedance matching network.

13. The system of claim 8, wherein the electronic processor is further configured to determine a power level for the transmit coil based on the coil alignment.

14. The system of claim 8, further comprising:
a first impedance matching network electrically coupled to the electronic processor; and
a second impedance matching network communicatively coupled to the electronic processor,
wherein the electronic processor is further configured to adjust, based on the efficiency and the coil alignment, at least one of a group consisting of a first impedance for first impedance matching network and a second impedance for the second impedance matching network.

* * * * *